United States Patent [19]
Willibald

[11] Patent Number: 5,265,811
[45] Date of Patent: Nov. 30, 1993

[54] MOBILE COMMINUTING ARRANGEMENT FOR ORGANIC WASTE MATERIALS

[75] Inventor: Josef Willibald, Frickingen 2/Altheim, Fed. Rep. of Germany

[73] Assignee: J. Willibald GmbH, Maschinenfabrik, Wald-Sentenhart, Fed. Rep. of Germany

[21] Appl. No.: 856,551

[22] Filed: Mar. 24, 1992

[30] Foreign Application Priority Data

Mar. 25, 1991 [DE] Fed. Rep. of Germany ....... 4109726

[51] Int. Cl.$^5$ ..................... A01F 29/02; A01D 90/00; B02C 18/40
[52] U.S. Cl. ................................. 241/101.7; 241/280
[58] Field of Search .................. 241/101.7, 294, 295, 241/280, 282

[56] References Cited

U.S. PATENT DOCUMENTS 4,852,816 8/1989 Doppstadt ..................... 241/101.7

FOREIGN PATENT DOCUMENTS 1419632 8/1988 U.S.S.R. ......................... 241/101.7

Primary Examiner—Douglas D. Watts
Attorney, Agent, or Firm—Anderson Kill Olick & Oshinsky

[57] ABSTRACT

A mobile comminuting arrangement for organic waste materials includes a load space with a mechanically driven scraper floor and a draw-in roller arranged above the scraper floor. The draw-in roller is mounted so as to be vertically adjustable by a rocker member. A comminuting unit is arranged following the draw-in roller in work direction and at a discharge end of the load space. The comminuting unit is a conventional flail-type mulching unit with rotating work shaft and rigid work flails. A roller-shaped driven cutter roller with rigid flail-type tools is arranged in work direction in front of the vertically movable draw-in roller, so that the cutter roller precomminutes the waste material being supplied by the scraper floor. All rotating units are protected toward the top by a continuous, partially articulated hood which forms a continuous feed duct.

6 Claims, 2 Drawing Sheets

MOBILE COMMINUTING ARRANGEMENT FOR ORGANIC WASTE MATERIALS

BACKGROUND OF THE INVENTION

1. Field of the Invention

The present invention relates to a mobile comminuting arrangement for organic waste materials. The arrangement includes a load space with a mechanically driven scraper floor and a metering or draw-in roller which is arranged above the scraper floor and is mounted so as to be vertically adjustable by means of a rocker member. A comminuting unit is arranged following the metering or draw-in roller in conveyance direction and on the end of the load space on the discharge side. The comminuting unit is a conventional flail-type mulching unit with rotating work shaft and rigid work flails.

2. Description of the Related Art

A comminuting arrangement of the above-described type is known from European patent 0 176 057. This known arrangement is in its basic construction composed of a load space with a mechanically driven scraper floor. A pair of metering rollers are arranged above the scraper floor and the actual comminuting unit is arranged following the metering rollers at one of the ends of the load space. In particular, the comminuting unit is flail-type mulching unit with rotating work shaft and freely swinging work flails.

All basic units are driven separately. However, the drives of all basic units are derived from the same principal drive.

The known arrangement is completed and becomes mobile by providing a truck and its own pick-up means at the loading platform or the base frame. In addition, the pair of metering rollers are arranged one behind the other in conveyance direction of the scraper floor and are mounted above the scraper floor on a rocker member so as to be vertically movable as a unit. The center of rotation of this rocker arm is located above the scraper floor and the travel path of the flails. Also, the draw-in roller located adjacent the actual comminuting unit has a smaller diameter than the metering roller located at the free end of the rocker arm.

The above-described known mobile comminuting arrangement has been used with excellent success in practice for a long time. The known comminuting arrangement is used particularly for the comminution of cemetery wastes, sawn timber and branch timber or brushwood from fruit production or forestry to be used for subsequent decomposition or similar fields of use in the private and public sectors.

However, especially in the field of work or use mentioned last, operational difficulties occur frequently because of jamming or clogging when, for example, large root stocks, tree stumps or trunk portions of cut trees of different types reach the region of the rocker member which supports the metering or feed roller.

SUMMARY OF THE INVENTION

Therefore, it is the object of the present invention to provide an arrangement of the above-described type in which the above-described disadvantages are avoided. Specifically, suitable additional means and features are to be provided which eliminate the above problems, so that the arrangement becomes even more universally useful.

In accordance with the present invention, a roller-shaped, driven cutter roller with rigid flail-type tools is arranged in conveyance direction in front of the vertically movable draw-in roller, so that the cutter rotor acts as a precomminuting means for the material being supplied by means of the scraper floor. All rotating units are protected toward the top by means of a continuous, partially articulated hood which forms a continuous feed duct.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1:
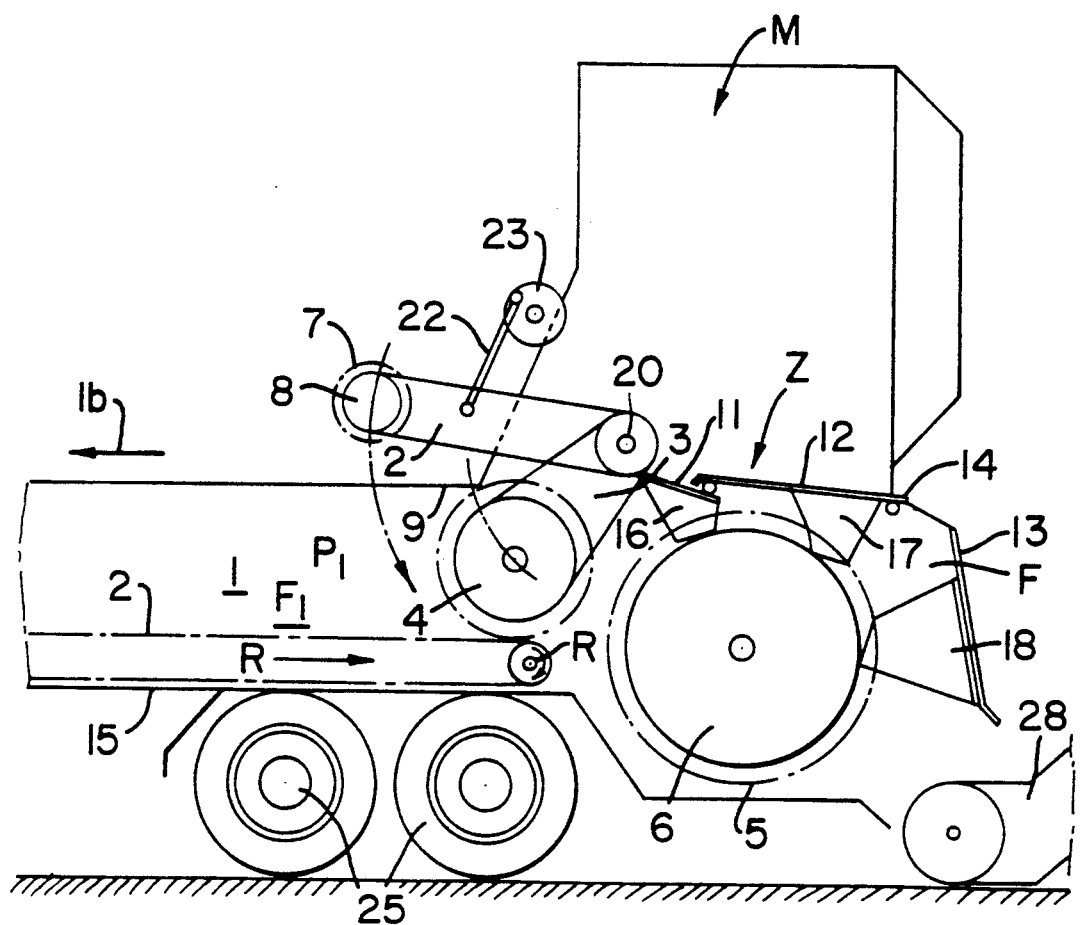
FIG. 1 is a schematic side view of the front portion of the comminuting arrangement according to the present invention.
Figure 2:
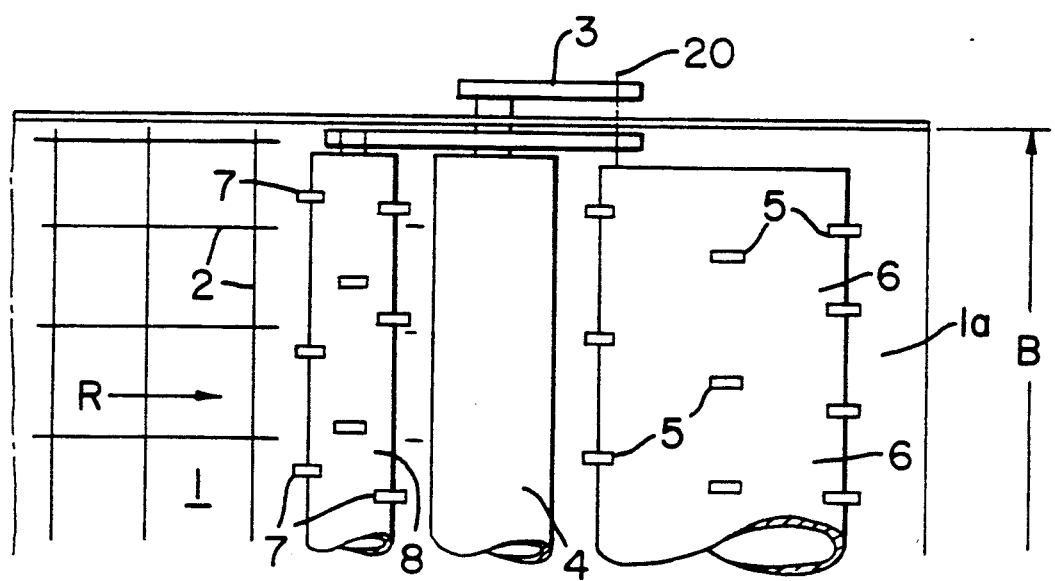
FIG. 2 is a top view of the arrangement of FIG. 1.
Figure 3:
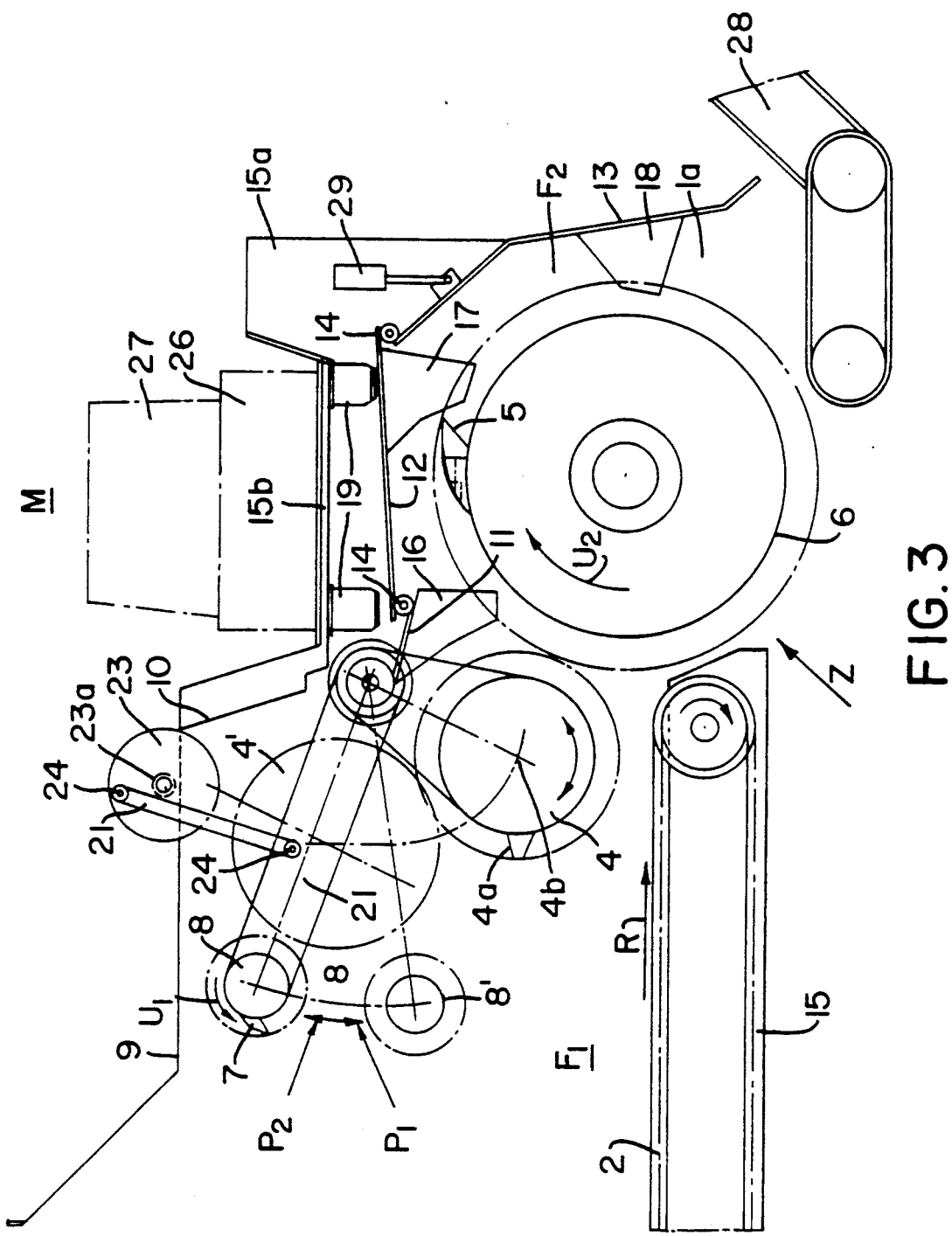
FIG. 3 is a schematic view, on a larger scale, of the comminuting units of the arrangement of FIG. 1.

The mobile comminuting arrangement according to the present invention shown in the drawing includes a frame 15 with wheels 25. The frame 15 is provided with an open load space 1 and at the bottom of the load space 1 is provided a mechanically driven scraper floor 2. A metering or draw-in roller 4 is arranged above the scraper floor 2 and is mounted so as to be vertically adjustable by means of a rocker member 3. A comminuting unit as an added unit Z is arranged following the metering or draw-in roller 4 in work direction R at the load space end 1a on the discharge side. The actual comminuting unit is a conventional, so-called flail-type mulching device with rotating work rollers 6 and rigid work flails 5.

The novel features provided by the present invention include a roller-shaped, driven cutting rotor 7, 8 arranged in conveyance direction R in front of the freely vertically movable draw-in roller 4. The cutting rotor 7, 8 acts as a precomminuting unit for the material which is supplied by the scraper floor 2. In addition, all rotating units 4, 6, 8 are protected toward the top by means of a continuous, partially hinged hood 9 to 13 which forms a continuous feed duct $F_1$ and $F_2$.

In accordance with another very important feature of the present invention, the rotor 8 with the preferably rigid flail-type tools 7 of the precomminuting unit extends over the entire width B of the load space 1 and is mounted at both ends thereof in rocker arms 21 which are connected so as to be raisable and lowerable by means of a crank arm 22 which includes a continuously adjustable eccentric drive 23. The rocker arms 21 guide the rotor 8 in front of the travel path 4' of the draw-in roller 4.

In accordance with another advantageous feature, the crank arm 22 and the pivot points 24 thereof at the drive wheel 23 and the rocker arms 21 are dimensioned and positioned in such a way that the cutting movement $P_1$ of the cutter rotor 8 which is directed downwardly toward the scraper floor 2 takes place slowly and the upward movement $P_2$ of the rotor 8 or of the rocker arms 21 takes place quickly. Particularly good operating results are obtained as a result of this feature.

In accordance with another special structural feature of the present invention, the rocker arms 21 for the precomminuting rotor 8 extend at the inner sides of side walls of the load space 1 and the rocker members 3 of the draw-in roller 4 are arranged on the outer side of the side walls of the load space 1 and rocker members 3 and the rocker arms 21 are mounted on the same continuous shaft 2a.

Slot-type guide means, not illustrated in the drawing, are provided in the side walls of the load space 1 for ensuring an unobstructed movement of the axis of rotation 4b of the draw-in roller 4 which moves without control and depending on the amount of material more or less far upwardly along the path of movement $P_3$.

The shafts of the hinges 14 of the movable duct wall portions 11, 12, 13 are supported in similar but smaller slot-type guide means or the like in the side walls of the feed duct portion $F_2$. For limiting the upward movement, stop members 19 are arranged above the hinges 14 of the movable duct walls 11 and 12 on the frame 15 in the region of the motor base plate 15b. As a result, the cross-section of the feed duct $F_2$ can be expanded to a small but sufficient extent in order to accommodate any very large pieces which have been drawn into the arrangement. Thus, the countercutting edges 16, 17, 18 on the inner sides of the feed duct $F_2$ are protected against damage or destruction.

Moreover, the distance between the free end portion 13 of the articulated duct wall and the main comminuting rotor 5, 6 may be initially adjustable by means of a gas pressure adjusting cylinder 29 or the like. In addition, the eccentric drives 22, 23 of the precomminuting units are individually adjustable to different operating conditions including the possibility of completely immobilizing or switching of the movements $P_1$ and $P_2$ of the rocker members 21.

Finally, the entire arrangement is completed by a hydraulic motor 27 for driving all units. The direction of rotation $U_1$ of the precomminuting unit 7,8 and the direction of rotation $U_2$ of the main comminuting rotor 5, 6 are opposite to each other. Of course, the rate of rotation of the units are individually and differently adjustable.

For discharging and further conveying the comminuted material which leaves the feed duct $F_2$, a conventional, for example, angle-type scraper floor 28 or a similar upwardly directed conveying means may be used. This conveying means should be partly suitable for forming compost stacks.

While a specific embodiment of the invention has been shown and described in detail to illustrate the application of the inventive principles, it will be understood that the invention may be embodied otherwise without departing from such principles.

I claim:

1. In a mobile comminuting arrangement for organic waste materials, the arrangement including side walls defining a load space, a mechanically driven scraper floor for moving the waste material being mounted in the load space, the scraper floor operating in a conveyance direction, a draw-in roller being arranged above the scraper floor, rocker members being connected to the draw-in roller for vertically adjusting the draw-in roller, the load space having a width and a discharge end, a comminuting unit being arranged following the draw-in roller in the conveyance direction and at the discharge end of the load space, wherein the comminuting unit is a flail-type mulching unit with rotating work shafts and rigid work flails, the improvement comprising a precomminuting means for the waste material which is moved by the scraper floor, the precomminuting means comprising a driven cutter roller with rigid flail-type tools, the precomminuting means being arranged in the conveyance direction in front of the draw-in roller, a continuous, partially articulated hood forming a continuous feed duct being arranged above and protecting the precomminuting means, the draw-in roller and the comminuting unit.

2. The arrangement according to claim 1, wherein the rotor of the precomminuting means extends over the width of the loading space, the rotor of the precomminuting means having two ends, the two ends being connected to rocker arms, each rocker arm being connected through a crank arm to a continuously adjustable eccentric drive for vertically moving the rocker arms and for guiding the rotor in front of the travel path of the draw-in roller.

3. The arrangement according to claim 2, further comprising a drive wheel for each crank arm, wherein the crank arms are connected to the drive wheels in pivot points, and wherein the pivot points and the rocker arms and the crank arms are positioned relative to each other such that a downwardly directed cutting movement of the precomminuting means takes place slowly and an upward movement of the precomminuting means takes place quickly.

4. The arrangement according to claim 2, wherein the rocker arms for the rotor of the precomminuting means extend on inner sides of the side walls of the load space, the rocker members of the draw-in roller being arranged on outer sides of the load space, wherein the rocker arms and the rocker members are arranged on a single continuous axis of rotation.

5. The arrangement according to claim 1, wherein the articulated hood includes hinges, stop means being arranged above the hinges, the stop means being mounted on a frame in the region of an engine base plate of the frame.

6. The arrangement according to claim 1, comprising a hydraulic motor for driving all rotating units, wherein the precomminuting means and the comminuting unit have directions of rotation which are opposite each other.

* * * * *